United States Patent [19]

Ebneth et al.

[11] Patent Number: 4,522,889

[45] Date of Patent: Jun. 11, 1985

[54] LIGHTNING PROTECTION COMPOSITE MATERIAL

[75] Inventors: Harold Ebneth, Leverkusen; Gerhard D. Wolf, Dormagen; Henning Giesecke, Cologne, all of Fed. Rep. of Germany

[73] Assignee: Bayer Aktiengesellschaft, Leverkusen, Fed. Rep. of Germany

[21] Appl. No.: 570,127

[22] Filed: Jan. 12, 1984

[30] Foreign Application Priority Data

Jan. 20, 1983 [DE] Fed. Rep. of Germany ....... 3301669

[51] Int. Cl.³ .............................................. H05F 1/02
[52] U.S. Cl. .................................. 428/614; 244/1 A; 361/218; 428/936
[58] Field of Search ............... 428/614, 634, 625, 626, 428/341, 335, 367, 252, 408, 936; 427/443.1; 204/21, 40, 38.7; 174/2, 3; 361/218; 244/1 A

[56] References Cited

U.S. PATENT DOCUMENTS

| | | | |
|---|---|---|---|
| 3,720,257 | 3/1973 | Beutler et al. | 428/614 |
| 3,755,713 | 8/1973 | Paszkowski | 244/1 A |
| 4,341,823 | 7/1982 | Sexton et al. | 428/614 |
| 4,429,341 | 1/1984 | King | 361/218 |
| 4,435,465 | 3/1984 | Ebneth et al. | 428/408 |
| 4,471,015 | 9/1984 | Ebneth et al. | 428/936 |
| 4,479,163 | 10/1984 | Bannink, Jr. et al. | 361/218 |

*Primary Examiner*—Peter K. Skiff
*Attorney, Agent, or Firm*—Sprung, Horn, Kramer & Woods

[57] ABSTRACT

A carbon fibre or aramid fibre fabric in a matrix of thermoset plastic is coated first with a thin layer of nickel, then with a highly conductive second layer, and on the outside once more with nickel. If the metals are deposited under wet-chemical currentless conditions, the flexible fabric will be electrically highly conductive. The composite material is particularly suitable for lightning and NEMP protection.

12 Claims, No Drawings

LIGHTNING PROTECTION COMPOSITE MATERIAL

The invention relates to a composite material comprising a metallised textile sheetlike structure in a plastics matrix and to its use in lightning protection.

Composite components made of aramid filament yarn fabrics and/or carbon filament yarn fabrics in combinations with epoxy resin or polyamide or bismalimide resins are used in the construction of aircraft to save weight (25th National SAMPE Symposium, San Diego, Calif., May 6–8, 1980). It is known to use such components for the flaps, ailerons, elevators and the like; it is said that in future whole structural segments are to be made of these composite materials.

Inadequate lightning protection is regarded as the most serious disadvantage of the composite components made of synthetic resins and reinforcing fibres. Lightning gives off, for a short time, high-frequency electromagnetic waves with energies to within the 1 GHz range; lightning is consequently in the same frequency range as the NEMP.

Moreover, fibre-reinforced plastics components in aircraft are prone to surprisingly high electrostatic charging (in particular on flying through snow, hail or sand storms), and they can become spontaneously discharged depending on the surrounding field. Owing to the presence of the plastic in the aircraft, there is no protection of the metallic lines and electronic equipment against penetrating electromagnetic waves.

The object of the invention is a material which, on the one hand, is so lightweight that its use leads to a saving in weight compared with metal and metallised glass fibres and which, on the other hand, has a conductivity so high that it can fulfil a lightning protection function for the complete component even under a high load of electric current.

According to the invention, this object is achieved by means of a composite material which essentially consists of a metallised textile sheetlike structure which is based on C-containing fibre material, which is embedded in a plastics matrix, and to which two, preferably three, metal layers have been applied in succession having a total surface resistance of less than 1 Ohm/squared.

These metal layers are 1) the base layer directly applied to the fibre, 2) the middle conductive layer and, if appropriate, 3) an external protective layer.

The degree of formation of the second or middle metal layer has the strongest effect on the feasibility of the composite material for lightning protection.

For a saving in weight to come to bear, a highly conductive metal, such as silver or copper or nickel, must be chosen for this layer. Copper is particularly preferable because of its price, the specific conductivity and because it is deposited relatively rapidly in thick layers. The thickness of this middle layer depends on the desired protecting action. If the component is only subjected to 50-kA lightning, a 1 µm thick copper layer is adequate. In certain cases, a pure nickel layer having a high conductivity can likewise be adequate. The lightning protection action afforded by such a material is already better than that with conventional components, where a 0.3 mm thick aluminium foil or an aluminium grid has been embedded in the plastic for lightning protection and is destroyed under the above-mentioned load. The suitability of the material according to the invention even under 200 kA lightning can be ensured merely by the fact that the second metal layer on the fibre or the fabric is chosen to be appropriately thick. A particularly advantageous measure of the layer thickness is the weight of metal per unit area or else the value of the surface resistance in Ohm in accordance with DIN 54,345.

The important factor is that the overall surface resistance of all 2 or 3 layers does not exceed the above-mentioned value of 1 Ohm.

The highly conductive second layer can be deposited on the fibre or the fabric by chemical currentless means or even electrochemically, which leads to a very uniform covering of the individual filaments and, despite the high conductivity, does not interfere much with the good flexibility of the fabric.

In a wet-chemical currentless coating, the individual fibre is covered very evenly with the metal, and there are no metal adhesions in the fibre and in the interspace, as a result of which the flexibility is only insignificantly restricted. A further characteristic is the high specific electric conductivity. Relative to the amount of metal deposited, an article coated under chemical currentless conditions is more conductive, by orders of magnitude, than if the same amount of metal had been applied conventionally, i.e. by vaporisation. Even fabrics on which a relatively large amount of metal has been deposited and whose surface resistance, measured in accordance with DIN 54,345, is less than 1 Ohm, have largely retained their textile character.

The base layer directly applied to the fibre preferably consists of nickel which has been deposited under wet-chemical currentless conditions. However, copper or silver can also be chemically deposited. This first layer is important for the middle highly conductive layer to be applied chemically or electrochemically sufficiently rapidly and adhering sufficiently firmly. The base layer can be very thin, i.e. markedly below 0.5 µm, preferably below 0.3 µm.

The outside metal layer of nickel which is applied if desired is required for mechanical and chemical reasons. Nickel surfaces form permanent oxide films within a short time, the so-called passivation, which also protect from corrosion the conductive layer underneath. As described in German Pat. No. A 3,106,506, the nickel film also has a positive effect on the fibrematrix adhesion. The outside layer of nickel on the fabric improves, for example, the interlaminar shear strength by more than 100%.

The interlaminar shear strength optimum is reached with nickel layers of 0.05 to 0.8 µm, preferably 0.1–0.2 µm.

The textile sheetlike structures to be used according to the invention are made of pure C fibres or C-containing organic fibres. They preferably consist of graphitic carbon fibres or aramid fibres or combinations thereof. For the intended purpose, virtually only filament yarn fabrics come into consideration for mechanical strength reasons. The diameter of a fibre is within the range from 3 to 10 µm. Aramid filament yarns can be used to improve in particular the edges of carbon filament yarn fabric. Unlike graphitic carbon fibres, aramid is a nonconductor. In the chemical metallisation the two types of fibre need not be treated differently. The same metals can be deposited in the desired amounts and layer thicknesses, with the same adhesion, in the same step on both qualities of fibre, after appropriate activation (preferably using metallo-organic complexes in accordance with German Patent Nos. A 3,025,307 and 3,148,280). It is also possible to nickel-plate C fibres directly by electrochemical means, owing to their conductivity. In view of the epoxy and polyimide resins which are preferred these days in aircraft construction, these resins are the preferred matrix for the composite materials according to the invention.

The composite material is particularly suitable as a lightning protection material because of the advantages described below: the material, which is lighter than metal, is able to withstand relatively high pulselike stresses of electric current. Repeated stresses are possible. The material can be economically tailored to the risk factor underlying the design. The material can be designed in such a way that 200 kA lightning does not lead to a destruction of the overall strength of the fabric combination used as constructional component, be it, for example, 6-layered or 22-layered. In the case of 2 mm thick aluminium sheet it is known that holes are molten into the material when it is struck by lightning, and that no damage is observed only when the aluminium is >8 mm thick. The electromagnetic protective action in the composite material according to the invention is preserved even after it has been struck by lightning, and electrostatic charges continue to be conducted away. Components made of the composite material can be electrically heated even if they are embedded in thermosetting plastics, and a result of that is for example that icing-up can be prevented. The outside nickel layer on the fabric prevents corrosion problems in the carbon fibre, since direct contact between carbon fibre and aluminium leads to the formation of aluminium carbides which effect chemical weakening of the C fibre. Direct contact between copper and aluminium should also be avoided. Owing to the high electrical conductivity of the metallised fabric it is possible to dispense with additionally incorporated aluminium sheet or wire mesh.

The examination for lightning protection suitability is carried out not only on the metallised fabric but also on the finished component. Patterns having a 95 mm diameter are clamped between two circular metal rings which serve as electrodes. The fabric rests on an insulating substrate. A high-voltage electrode of 10 mm diameter is held against the fabric with light pressure (direct contact) or is held at a distance of 1 mm from the surface of the fabric (gap). In the first case, the current passes into the fabric over an area of about 0.8 cm², and in the second case current passes into the fabric in a manner close to practice, namely via an arc which forms between the edge of the electrode and the surface of the fabric.

There was available a current pulse machine having a capacity of 12.5 μF and a maximum load voltage of 60 kV. With this arrangement it is possible to use current pulses having apex values above 50 kA. The necessary means for measuring voltage and current are incorporated in the machine. The currents given relate to the apex value of the first semiperiod, which lasts a period of about 20 μsec.

The studies are carried out with current pulses of 10, 30 and 50 kA, in each case with direct contact or by way of arcs. In order to eliminate the influence of prior damage, an unstressed piece of fabric is clamped in the experimental set-up for each instance of stress with electrical current. The introduction of electrical current by way of a direct contact or by way of an arc does not produce any significant difference. The areas where a removal of metal could take place are roughly the same size. There is no observation of damage to the carbon filaments by the arc.

The resistance between the high-voltage electrode and the ringshaped electrode is measured with a bridge. Below, $R_0$ refers to the resistance in the state as new, $R_1$ refers to the resistance after stress with current; the increase in resistance by the pulse of electric current is characterised by the quotient of $R_1/R_0$.

EXAMPLE 1

A carbon multifilament yarn fabric sized 40×46 cm in an L 1/1 plain weave as classified by DIN 60,900, consisting of 3,000 individual filaments having a total linear density of 200 tex (g/1,000 m) with 5 threads per cm in both warp and weft direction and having a weight per unit area of 200 g/m² is dipped into a solution of 0.25 g of butadienepalladium dichloride per litre in 1,1,1-trichloroethane and is dried. It is then nickel-coated at room temperature in the course of 4 minutes in a bath which contains per litre 30 g of nickel chloride, 3 g of dimethylaminoborane and 10 g of citric acid and has been brought to pH 8.1 with ammonia. The nickel-coated fabric is washed, is then introduced into an alkaline coppering bath which contains per litre 10 g of copper sulphate, 15 g of potassium sodium tartrate tetrahydrate and 20 ml of 35% strength by weight formaldehyde solution and is brought to pH 12.8-13.8 with sodium hydroxide solution, and is coated with copper at room temperature for 15 minutes. The metallised fabric is then washed and nickel-coated once more in the nickel bath at room temperature in the course of 4 minutes. The fabric is then washed and dried. The weight of the carbon fabric has increased by 15 g/m². The resistance of a 10×10 cm square area is 0.1 Ohm, not only in the weft but also in the warp direction. The thickness of the deposited metal layer on an individual filament is 0.2 μm.

The fabric was subjected to simulated lightning, giving the increase in resistance shown in the table. The fabric was not destroyed until a level of 60 kA was reached; in the simulating of the lightning, it was immaterial whether the contact was directly on the fabric or whether a gap of 1 mm in length was left.

TABLE 1

| Current kA | Contact | $R_1/R_0$ ($R_0$ = 88-99 mΩ) |
| --- | --- | --- |
| 10 | direct | 1.27 |
| 30 | direct | 1.31 |
| 30 | gap | 1.34 |
| 50 | direct | 1.60 |
| 50 | gap | 1.94 |

EXAMPLE 2

A carbon multifilament yarn fabric sized 30×30 cm in an S 1/7 satin weave as classified by DIN 60,900, consisting of 3,000 monofilaments having a total linear density of 200 tex (g/1,000 m) and having a weight per unit area of 320 g/m² with 8 threads per cm in both warp and weft is activated in a colloidal palladium/tin bath and is developed with sodium hydroxide solution. The fabric thus activated is metallised in a nickel bath as described in Example 1 for 10 minutes, then in a copper bath as described in Example 1 for 6 hours and then in a nickel bath as described in Example 1 for 10 minutes. The metallisation produces a flexible metallised carbon mat which has a metal weight increase of 333 g/m². The resistance of a 10×10 cm square area is 0.004 Ohm in the warp direction and 0.006 Ohm in the weft direction. The overall thickness of the deposited metal layer on a monofilament is 3.5 μm.

The fabric was subjected to simulated lightning as in Example 1; the fabric was not destroyed until a level of 60 kA was reached, and it was immaterial whether the contact was directly on the fabric or whether a gap of 1 mm in length was left.

TABLE 2

| Current kA | Contact | $R_1/R_0$ ($R_0 = 26-31$ mΩ) |
|---|---|---|
| 10 | direct | 1.00 |
| 10 | gap | 1.01 |
| 30 | direct | 1.26 |
| 30 | gap | 1.20 |
| 50 | direct | 1.83 |
| 50 | gap | 1.49 |

The induction of current by direct contact or via an arc (gap 1 mm) makes no significant difference. The areas in which removal of metal could take place are substantially the same size. There is no observation of damage to the carbon filaments through the arc.

When 10 kA are passed into the metallised carbon filament yarn fabric there is no increase in resistance, nor is the current observed to leave any marks. From the electrode diameter of 10 mm it is possible to calculate an area current density of about 3 kA per cm of width of the material.

From the diameters of the marks left by 30 kA and 50 kA current there follows a value of about 4.5 kA per cm of the width of the material, which does not cause the destruction of the material.

If the fabric is subjected to repeated loads, the resistance increases with the number of loads and is associated with a gradual increase in the size of the mark left by the current; however, the fabric is not destroyed, viz. there is no melting of holes into the fabric.

Even in the event of visible removal of metal, the observed increase in the resistance of the material is moderate, for example from 28 to 51 mΩ at 50 kA and 25 direct contact, and from 31 to 46 mΩ at 50 kA and contact via the arc.

EXAMPLE 3

A carbon multifilament yarn fabric sized 40×46 cm in an L 1/1 plain weave as classified by DIN 60,900, consisting of 3,000 monofilaments having a total linear density of 200 tex (g/1,000 m) and having a weight per unit area of 200 g/m² with 5 threads per cm in both warp and weft is dipped into a solution of 0.25 g of butadiene-palladium dichloride per litre in 1,1,1-trichloroethane and is dried. It is then nickel-coated at room temperature for 4 minutes in a bath which contains per litre 30 g of nickel chloride, 3 g of dimethylaminoborane and 10 g of citric acid and is brought to pH 8.1 with ammonia. The nickel-coated fabric is washed and is then electrochemically coated with copper.

It is first of all pickled in dilute sulphuric acid and then electrochemically coated with copper for about 110 minutes at 57° C., 6–8 volt, 3 A/dm² and an uptake of electric current of 100 A. About 300 g of copper are absorbed in this time. The fabric is then briefly dipped at room temperature into sulphuric acid and is chemically coated with nickel. The surface resistance of this sample is 0.003 Ohm not only in the weft direction but also in the warp direction.

A sample board was prepared from 6 layers of graphite filament yarn fabric as a prepreg in such a way that the metallised fabric was the outside layer. The resin matrix used was epoxy resin. The sample was adjusted in such a way in the testing equipment that the lightning always struck the metallised, first fabric layer.

The test was conducted in accordance with MILSTD-1757, test method T0 2 "Lightning Qualification Tests Techniques for Aerospace Vehicles and Hardware" 17 June 1980 and SAE AE4L Report "Lightning Test Waveform and Techniques for Aerospace Vehicles and Hardware" 20 June 1978. A simulated stroke of lightning of 200 kA, $2 \times 10^6 A^2.s$ (zone 1A) did not destroy the carbon composite board. The top, metallised layer had a mark left by the current, sized about 1 cm², where the metal layer had evaporated. The carbon fabric underneath the metal (1st layer) had hardly been damaged. The 5 further layers of unmetallised carbon fibre fabric underneath showed no sign of destruction. The test specimen had been impregnated on the surface with the same epoxy resin and had been coated with a standard aircraft finish (epoxy layer in accordance with (BMS) 10–79 type 2 primer from Boeing and a top layer of polyurethane (about 0.002 mm thick) in accordance with (BMS) 10–60, type 2 from Boeing). Composite materials of this type are highly suitable, for example for manufacturing lightning-protected elevators on aircraft.

EXAMPLE 4

An aramid filament yarn fabric (Kevlar) in an L 1/1 plain weave with a weight per unit area of 80 g/m² was coated with nickel as described in German Patent No. A 3,139,313.

The sample, having a total metal weight of 80 g of total metal/m², was tested under lightning as in Example 3. Simulated lightning of 100 kA, $0.25 \times 10^6$ A².s (zone 2 A), did not destroy the aramid filament yarn fabric, although the metal layer had evaporated where the current had passed in. The 5 layers of carbon filament yarn fabric underneath showed no sign of destruction.

EXAMPLE 5

A carbon filament yarn fabric which contained Kevlar filament yarns for technical reasons was metallised as described in Example 3. The total metal layer amounted to 180 g/m². Simulated lightning of 200 kA, $2 \times 10^6 A^2.s$ and 3.6 kA, 10 coulombs, left a mark where the current had passed in but did not destroy the carbon filament yarn fabric underneath. The metal layer had evaporated where the lightning had struck.

EXAMPLE 6

The same carbon filament yarn fabric as in Example 5, having a metal weight of 100 g/m², was subjected to lightning of 100 kA, 0.25 $10^6 A^2.s$ and 3.6 kA, 10 coulombs. Apart from leaving a mark where the current had passed in, it did not destroy the carbon filament yarn fabric.

Lightning of 200 kA (as above) destroyed the first layer of metallised carbon fabric in the composite component. The non-metallised carbon fabric layers underneath showed no visual sign of attack in the first two layers.

EXAMPLE 7

A carbon filament yarn fabric containing aramid filament yarns, as described in Example 5, was chemically coated with copper, was further coated with copper by electrochemical means and was finally treated with nickel to avoid oxidation of the copper layer. The total metal layer amounted to 288 g/m². It was subjected to lightning of 200 kA.

Except for the current leaving the mark, the same result as in Example 5 was obtained.

EXAMPLE 8

An aramid filament yarn fabric in a ⅓ satin weave with a weight per unit area of 220 g/m² was chemically coated with nickel as in Example 1 to give an 0.15 μm thick layer of nickel around the monofilament. The fabric was then chemically coated with copper in a conventional manner to a level of about 350 g of copper/m² and was finally electrochemically coated with metal to give an overall weight of metal of 404 g of metal/m². This metallised Kevlar fabric was embedded as the top layer in a composite board of 5 carbon fabric layers, and was coated with a finish, and was subjected to lightning of 100 kA. The top layer showed no sign of damage, nor did the 5 layers underneath show any sign of damage.

When subjected to 200 kA lightning, this combination showed a mark from the lightning sized about 2.5 cm² in the top layer, while the carbon fabric layers underneath showed no sign of damage.

EXAMPLE 9

An aramid fibre fabric is metallised as in Example 8, except that the coppering is performed electrochemically in a conventional manner to the same thickness of metal. The lightning test produced the same results as in Example 8.

We claim:

1. A lightning protection composite material comprising a metallised textile sheetlike structure embedded in a plastics matrix, the sheetlike structure comprising C-containing fibre material to which have been applied in succession at least two, metal layers having a total surface resistance of less than 1 Ohm at least one metal layer is nickel and at least on metal layer is cooper.

2. A lightning protection material according to claim 1, characterised in that the metal layer applied directly to the fibre consists of nickel.

3. A lightning protection composite material according to claim 1, characterised in that the metal layer applied directly to the fibre is generated under wet-chemical currentless conditions.

4. A lightning protection composite material according to claim 1, characterised in that the thickness of the directly applied metal layer is less than 0.3 μm.

5. A lightning protection composite material according to claim 1, characterised in that the second metal layer is highly conductive and comprises copper which is applied by wet-chemical currentless or electrochemical means.

6. A lightning protection composite material according to claim 1, characterised in that an outside corrosion protection metal layer is applied to the highly conductive second metal layer.

7. A lightning protection composite material according to claim 1, characterised in that it carriers a third, outside metal layer comprising nickel.

8. A lightning protection composite material according to claim 1, characterised in that the textile material consists of graphitic carbon fibres or aramid fibres or a mixture of the two.

9. A lightning protection composite material according to claim 1, characterised in that the matrix consists 10. A lightning protection material according to claim 1, wherein the metal weighs from about 180 to 404 g/m².

11. A lightning protection material according to claim 1, wherein the metal weighs less than about 180 g/m².

12. A lightning protection material according to claim 11, wherein the metal comprises nickel.

* * * * *

UNITED STATES PATENT AND TRADEMARK OFFICE
CERTIFICATE OF CORRECTION

PATENT NO. : 4,522,889
DATED : June 11, 1985
INVENTOR(S) : Harold Ebneth, et al.

It is certified that error appears in the above-identified patent and that said Letters Patent is hereby corrected as shown below:

| | |
|---|---|
| Col. 8, line 3 | After "Ohm" insert --,-- |
| Col. 8, line 4 | Delete "on" and insert --one-- |
| Col. 8, line 26 | Delete "carriers" and insert --carries-- |
| Col. 8, line 33 | After "consists" insert --of epoxy, polyamide or bismalimide resins -- |
| Col. 8, lines 34 to 36 | Delete claim 10 in its entirety and renumber claims 11 and 12 as 10 and 11 respectively. |
| 1st page, last line | Delete "12 claims" and substitute --11 claims-- |

Signed and Sealed this

Fifteenth Day of April 1986

[SEAL]

Attest:

DONALD J. QUIGG

Attesting Officer

Commissioner of Patents and Trademarks